United States Patent
Loterie et al.

(10) Patent No.: US 11,446,861 B2
(45) Date of Patent: Sep. 20, 2022

(54) METHODS AND APPARATUS FOR THREE-DIMENSIONAL FABRICATION BY TOMOGRAPHIC BACK PROJECTIONS

(71) Applicant: ECOLE POLYTECHNIQUE FEDERALE DE LAUSANNE (EPFL), Lausanne (CH)

(72) Inventors: Damien Loterie, Ecublens (CH); Paul Delrot, Montreux (CH); Christophe Moser, Lausanne (CH)

(73) Assignee: Ecole PolyTechnique Federale de Lausanne (EPFL), Lausanne (CH)

( * ) Notice: Subject to any disclaimer, the term of this patent is extended or adjusted under 35 U.S.C. 154(b) by 178 days.

(21) Appl. No.: 16/641,680

(22) PCT Filed: Aug. 23, 2018

(86) PCT No.: PCT/IB2018/056389
§ 371 (c)(1),
(2) Date: Feb. 25, 2020

(87) PCT Pub. No.: WO2019/043529
PCT Pub. Date: Mar. 7, 2019

(65) Prior Publication Data
US 2020/0384682 A1     Dec. 10, 2020

(30) Foreign Application Priority Data
Aug. 30, 2017   (WO) .................. PCT/IB2017/055209

(51) Int. Cl.
*B29C 64/124*     (2017.01)
*B33Y 10/00*     (2015.01)
(Continued)

(52) U.S. Cl.
CPC .......... *B29C 64/124* (2017.08); *B29C 64/241* (2017.08); *B29C 64/393* (2017.08);
(Continued)

(58) Field of Classification Search
CPC ... B29C 64/124; B29C 64/393; B29C 64/241; B33Y 10/00; B33Y 30/00; B33Y 50/02; H04N 1/00649
(Continued)

(56) References Cited

U.S. PATENT DOCUMENTS

| | | |
|---|---|---|
| 5,344,298 A | 9/1994 | Hull |
| 6,500,378 B1 | 12/2002 | Smith |

(Continued)

FOREIGN PATENT DOCUMENTS

| | | |
|---|---|---|
| EP | 3 018 531 A1 | 5/2016 |
| WO | 2016/173474 A1 | 11/2016 |
| WO | 2018/208378 A2 | 11/2018 |

OTHER PUBLICATIONS

Brett Kelly et al: "Computed Axial Lithography (CAL): Toward Single Step 3D Printing of Arbitrary Geometries", May 16, 2017, https://arxiv.org/pdf/1705.05893.pdf (Year: 2017).*

(Continued)

*Primary Examiner* — Joseph S Del Sole
*Assistant Examiner* — Lawrence D. Hohenbrink, Jr.
(74) *Attorney, Agent, or Firm* — Finch & Maloney PLLC; Jay S. Franklin; Michael J. Bujold

(57) ABSTRACT

A method for producing a three-dimensional object comprising computing a sequence of back-projections describing the three-dimensional object to be formed from different orientation angles of the object, defining a sequence of patterns of light using the back-projections, and irradiating with each of the patterns of light at the respective corresponding orientation angle. According to the defined sequence, a photoresponsive material is capable of altering its material phase, upon irradiation by light, thereby creating a three-dimensional distribution of alterations within the photoresponsive medium which physically reproduces the (Continued)

three-dimensional object, thereby creating the three-dimensional object.

13 Claims, 12 Drawing Sheets

(51) Int. Cl.
*B33Y 30/00* (2015.01)
*B33Y 50/02* (2015.01)
*B29C 64/393* (2017.01)
*B29C 64/241* (2017.01)
*H04N 1/00* (2006.01)

(52) U.S. Cl.
CPC ............... *B33Y 10/00* (2014.12); *B33Y 30/00* (2014.12); *B33Y 50/02* (2014.12); *H04N 1/00649* (2013.01)

(58) Field of Classification Search
USPC .............................................. 264/401, 40.1
See application file for complete search history.

(56) References Cited

U.S. PATENT DOCUMENTS

| | | | |
|---|---|---|---|
| 7,438,846 B2 | 10/2008 | John | |
| 7,892,474 B2 | 2/2011 | Shkolnik et al. | |
| 9,360,757 B2 | 6/2016 | DeSimone et al. | |
| 10,299,940 B2 * | 5/2019 | Kloke | B33Y 70/00 |
| 2018/0153205 A1 | 6/2018 | Wu | |
| 2018/0326666 A1 * | 11/2018 | Kelly | B33Y 50/02 |
| 2019/0033719 A1 * | 1/2019 | Cole | B33Y 80/00 |

OTHER PUBLICATIONS

M. Monzón et al., "Anisotropy of Photopolymer Parts Made by Digital Light Processing", Materials, vol. 10, No. 1, pp. 64-, Jan. 2017, See Spec., p. 1.
R. Quintana et al., "Effects of Build Orientation on Tensile Strength for Stereolithography-Manufactured ASTM D-638 Type I Specimens", International Journal of Advanced Manufacturing Technology, vol. 46, No. 1, pp. 201-215, Jan. 2010, See Spec., pp. 1 & 2.
B. Kelly et al., "Computed Axial Lithography (CAL): Toward Single Step 3D Printing of Arbitrary Geometries", https://arxiv.org/pdf/1705.05893.pdf, May 16, 2017, See International Search.
International Search Report Corresponding to PCT/IB2018/056389 dated Dec. 19, 2018.
Written Opinion Corresponding to PCT/IB2018/056389 dated Dec. 19, 2018.

* cited by examiner

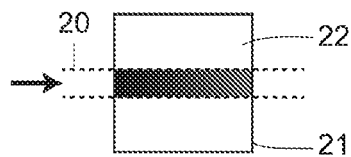 
Figure 2A   Figure 2B
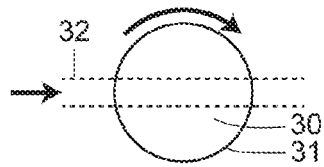 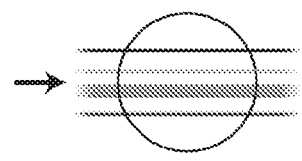
Figure 3A   Figure 3B
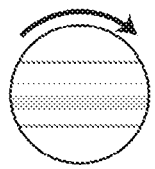 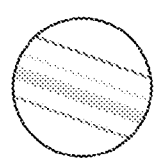
Figure 3C   Figure 3D
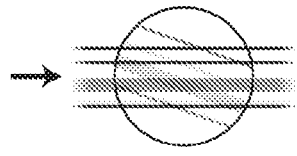 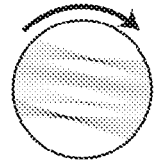
Figure 3E   Figure 3F
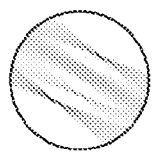 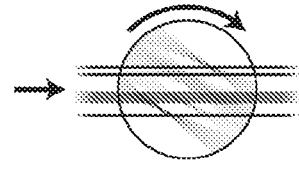
Figure 3G   Figure 3H
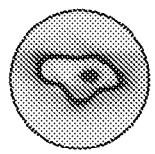 
Figure 3I   Figure 3J

METHODS AND APPARATUS FOR THREE-DIMENSIONAL FABRICATION BY TOMOGRAPHIC BACK PROJECTIONS

FIELD OF THE INVENTION

The present invention relates to methods and apparatus for the fabrication of three-dimensional objects from photoresponsive materials (additive manufacturing). In particular, the present invention is related, but not restricted, to manufacturing systems wherein the objects are generated by tomographic back-projections.

BACKGROUND

In conventional additive manufacturing, a three-dimensional object is fabricated either by pointwise scanning of the object volume or in a layer-by-layer fashion. An example is stereolithography (SLA) (see for example U.S. Pat. No. 5,344,298), where the object is formed one layer at a time by the solidification of a photocurable resist under light irradiation. The successive layers of the object can be defined for example by scanning a laser beam point-by-point, as suggested in U.S. Pat. No. 5,344,29, or by digital light processing (DLP) technology, as described in U.S. Pat. No. 6,500,378.

In these methods the object is usually built in a preferential growing direction, which may result in anisotropic mechanical properties of the object. In DLP, where a matrix of mirrors is used to project a cross-section layer of the object, small areas between the projected pixels remain uncured resulting in anisotropy between the plane of the cured layers and the build direction (M. Monzón, Z. Ortega, A. Hernández, R. Paz, and F. Ortega, "Anisotropy of photopolymer parts made by digital light processing," *Materials*, vol. 10, no. 1, pp. 64-, January 2017). Moreover, in SLA methods where a laser spot is selectively scanning and curing a layer, the build orientation of a part has a significant impact on the mechanical properties of the printed object (R. Quintana, J.-W. Choi, K. Puebla, and R. Wicker, "Effects of build orientation on tensile strength for stereolithography-manufactured ASTM D-638 type i specimens," *International Journal of Advanced Manufacturing Technology*, vol. 46, no. 1, pp. 201-215, January 2010). Consequently, post-curing of the fabricated objects may be required to ensure isotropic covalent bonding between and within the different layers.

Furthermore, SLA suffers from slow printing speeds owing to their sequential layer-by-layer processing. Once a layer is irradiated and cured, a new layer of uncured material must be provided above or below the solid layer, depending on the build direction. In prior art, this is achieved by mechanically recoating the part under fabrication (U.S. Pat. Nos. 7,892,474 and 7,438,846), which, in addition to reducing the printing speed, may distort the end part.

More recently, a new approach called continuous liquid interphase printing (CLIP) (U.S. Pat. No. 9,360,757) has been developed to avoid this recoating operation. CLIP relies on the formation of a persistent oxygen-inhibited liquid layer of polymer between the optically transparent window of the polymer pool and the built part. The upward motion of the built part results in a suction force that replenishes the persistent liquid polymer layer. Though the production of parts is made faster and in a more continuous manner with CLIP, it still requires mechanical actuation and slicing of the object as only a thin layer of the build region is cured at once. Furthermore, in CLIP the dynamic viscosity of the liquid polymer limits the printing speed since it drives the replenishment time of the persistent liquid layer below the built part.

Consequently, there is a need for a fabrication method of three-dimensional object without any step-wise mechanical actuation of the build region, which may distort or contaminate the object; and without any motion of the photoresponsive material, which may slow down the fabrication process. Moreover, there is a need for a fabrication process that produces the object rapidly and isotropically and does not operate in a layer-by-layer manner that may degrade the mechanical properties of the end part.

SUMMARY OF THE INVENTION

In a first aspect, the invention provides a method for producing a three-dimensional object comprising:
  a. computing a sequence of back-projections describing the three-dimensional object to be formed from different orientation angles of said object,
  b. defining a sequence of patterns of light using said back-projections, and
  c. irradiating with each of said patterns of light at the respective corresponding orientation angle and according to the defined sequence a photoresponsive material that is capable of alteration of its material phase upon irradiation by light, thereby creating a three-dimensional distribution of alterations within the photoresponsive medium which physically reproduces said three-dimensional object, thereby creating the three-dimensional object.

In a preferred embodiment, said back-projections are computed using any one of the following list:
  a Radon-transform followed by a tomographic reconstruction filter;
  a fan-beam algorithm followed by a tomographic reconstruction filter;
  a cone-beam algorithm followed by a tomographic reconstruction filter;
  an iterative reconstruction technique;
  an algebraic reconstruction technique; or
  a diffractive tomography algorithm.

In a further preferred embodiment, the method comprises providing said photoresponsive material from the following list:
  a monomer;
  a prepolymer;
  one or more photo-initiators that interact with said light or another light source to selectively alter the phase of said photoresponsive material;
  a chain extender;
  a reactive diluent;
  a filler;
  a pigment or dye;
  or a combination thereof.

In a further preferred embodiment, the phase of said photoresponsive material prior to said irradiation by said patterns of light is:
  of a liquid;
  of a solid;
  of a gel.

In a further preferred embodiment, said photoresponsive material comprises a dynamic viscosity between 1000 and 50000 centipoises at a temperature of 25° C.

In a further preferred embodiment, said photoresponsive material comprises a concentration of said photo-initiator such that at most 90% of the intensity of said patterns of light is absorbed by the largest thickness of said volume of said photoresponsive material through which said patterns of light are propagating.

In a further preferred embodiment, the method comprises further steps for producing a multi-material three-dimensional object, comprising:
a. removing uncured parts of said photoresponsive material and immersing said three-dimensional object into another photoresponsive material, and
b. repeating the steps of calculating, irradiating and removing until said multi-material three-dimensional object is produced.

In a second aspect, the invention provides a system for producing a three-dimensional object from a photoresponsive material, the system comprising:
a first projection unit capable of emitting controlled spatial patterns of light;
a means for computing a sequence of back-projections describing the three-dimensional object to be formed from different orientation angles of said object; said back-projections being used to define said controlled patterns of light;
a vessel optically transparent to said patterns of light, said vessel intended to contain a volume of photoresponsive material, and said vessel and the intended photoresponsive material defining a build volume;
whereby the first projection unit is arranged in the system to irradiate said build volume with said controlled patterns of light; and
a direction varying means operatively associated with said first projection unit, for controllably varying a direction of incidence of said patterns of light relative to said build volume, either by rotating the build volume within the field of illumination of the first projection unit, or by rotating the first projection unit relative to the build volume, or a combination of both of these rotations such to execute the computed sequence of back-projections by irradiating with the controlled patterns of light from directions corresponding to the different orientation angles thereby creating a three-dimensional distribution of alterations of the photoresponsive medium, and creating the three-dimensional object.

In a further preferred embodiment, said first projection unit comprises a source of light and at least one of a spatial light modulator, a digital micromirror device, a galvanometer-scanner, or an acousto-optic deflector.

In a further preferred embodiment, the source of light comprises any one of the list comprising a laser, a combination of multiple lasers, or a LED.

In a further preferred embodiment, said first projection unit comprises a LED array.

In a further preferred embodiment, the system additionally comprises a controller operatively associated with said build volume and said first projection unit, said controller, rotating said build volume about a rotation axis while synchronously illuminating said build volume with a sequence of patterns of light until the three-dimensional object is formed.

In a further preferred embodiment, the system additionally comprises a photoresponsive material that comprises any one of the following list:
a monomer;
a prepolymer;
one or more photo-initiators that interact with said light or another light source to selectively alter the phase of said photoresponsive material;
a chain extender;
a reactive diluent;
a filler;
a pigment or dye;
a combination thereof.

In a further preferred embodiment, the phase of said photoresponsive material prior to said irradiation by said patterns of light is any one of the list comprising:
a liquid;
a solid;
a gel.

In a further preferred embodiment, said photoresponsive material comprises a dynamic viscosity between 1000 and 50000 centipoises at a temperature of 25° C.

In a further preferred embodiment, said photoresponsive material comprises a concentration of said photo-initiator such that at most 90% of the intensity of said patterns of light is absorbed by the largest thickness of said volume of said photoresponsive material through which said patterns of light are propagating.

In a further preferred embodiment, the first projection unit is oriented such that the illumination direction is parallel to the plane of rotation of the build volume.

In a further preferred embodiment, additionally to said first projection unit, the apparatus comprises a second projection unit capable of generating patterns of light at a second wavelength of light.

In a further preferred embodiment, the direction of illumination of the first and the second projection units are parallel to the plane of rotation of the build volume.

In a further preferred embodiment, the direction of illumination of any one of the first and second projection units is parallel to the plane of rotation of the build volume, and the illumination direction of the other projection unit is perpendicular to the plane of rotation of the build volume.

In a further preferred embodiment, the system is further configured such that said build volume is illuminated with a first sequence of spatial light patterns at a first wavelength, and concurrently said build volume is illuminated with a second sequence of spatial light patterns at second wavelength, until the three-dimensional object is formed.

In a further preferred embodiment, said photoresponsive material comprises a photo-inhibitor that interacts with said second wavelength of light to selectively hinder the ability of the first wavelength of light to alter the phase of said photoresponsive material.

In a further preferred embodiment, said photoresponsive material comprises a two-stage photo-initiator, such that said photoresponsive material is locally altered upon local simultaneous or successive illumination with said first and second wavelengths of light but not altered if locally illuminated with only one of the wavelengths of light.

In a further preferred embodiment, said photoresponsive material is seeded with cells.

In a further preferred embodiment, said photoresponsive material is loaded with solid particles.

In a further preferred embodiment, said solid particles include any one of the following list:
ceramic particles,
metallic particles,
polymeric particles,
any combination thereof.

In a further preferred embodiment, said spatial light patterns are
point-like; or
one-dimensional (linear); or
two-dimensional (planar); or
three-dimensional (volumetric or "holographic")

In a further preferred embodiment, said system further comprises any one of the following list:
- a temperature controlling means for controlling the temperature of said photoresponsive material;
- a moisture controlling means for controlling the moisture of said photoresponsive material;
- an oxygen concentration controlling means for controlling the oxygen concentration in said photoresponsive material;
- a carbon dioxide concentration controlling means for controlling the carbon dioxide concentration in said photoresponsive material;
- a nitrogen concentration controlling means for controlling the nitrogen concentration in said photoresponsive material;
- any combination thereof.

In a further preferred embodiment, a controller is operatively associated with said build volume for vertically displacing the build volume relative to the field of illumination of the projection unit or projection units.

In a further preferred embodiment, the light patterns are corrected for effects of a sedimentation of the photoresponsive material.

In a further preferred embodiment, said light patterns are corrected for effects of a misalignment of the build volume relative to the direction of incidence of the light patterns.

In a further preferred embodiment, said light patterns are corrected for effects of an absorption of light within said photoresponsive material.

In a further preferred embodiment, the system is further configured such that after the formation of the three-dimensional object:
- said three-dimensional object is kept into the build volume while the remaining photoresponsive medium is removed from the build volume;
- a second photoresponsive medium different from the said first photoresponsive medium is filled into the said optically transparent vessel; and
- a second three-dimensional object is formed from the second photoresponsive medium with the methods of any preceding claims.

In a further preferred embodiment, the system is further configured so that the alterations of said photoresponsive medium are recorded at regular intervals during the irradiation with said patterns of light, and these recordings are used as feedback to correct subsequent patterns of light in order to produce said three-dimensional object with improved accuracy.

In a further preferred embodiment, the recordings of the alterations of said photoresponsive medium are done by means of phase contrast imaging, differential interference contrast, or holography.

In a further preferred embodiment, said vessel containing said photoresponsive material is further configured to automate the injection and removal of said photoresponsive material.

In a further preferred embodiment, a means is provided for extracting said formed three-dimensional object from said build volume after it is produced.

In a further preferred embodiment, said vessel is sterilized in order not to contaminate said photoresponsive material and said formed three-dimensional object.

In a further preferred embodiment, said photoresponsive material is loaded with biological cells before forming the three dimensional object around said biological cells.

In a further preferred embodiment, the biological cells are undifferentiated stem cells.

In a further preferred embodiment, the three dimensional object is a hydrogel with support biological material for cell growth.

In a further preferred embodiment, biological cells are injected after the said three dimensional object is formed.

In a further preferred embodiment, the biological cells are undifferentiated stem cells.

In a third aspect, the invention provides a formed biological organ created as a result of a biological process of cell growths from said biological cells in said formed three dimensional object produced following either the system wherein said photoresponsive material is loaded with biological cells before forming the three dimensional object around said biological cells or the system wherein biological cells are injected after the said three dimensional object is formed.

In a further preferred embodiment, said formed three-dimensional object is identified with a serial number.

In a further preferred embodiment, said formed three-dimensional object has anisotropic mechanical properties.

In a fourth aspect, the invention provides a method for reproducing a three-dimensional object comprising the steps of
obtaining a three dimensional scan of an object, and
forming a copy of the three dimensional object according to the method for method for producing a three-dimensional object.

BRIEF DESCRIPTION OF THE DRAWINGS

The invention will be better understood through the detailed description of preferred embodiments and in reference to the drawings, wherein

FIGS. 2A-2B are a schematic illustration of fabrication in a static configuration;

FIG. 3A-3J are a schematic illustration of fabrication in a rotating configuration;

DETAILED DESCRIPTION OF PREFERRED EMBODIMENTS

Figure 1A:
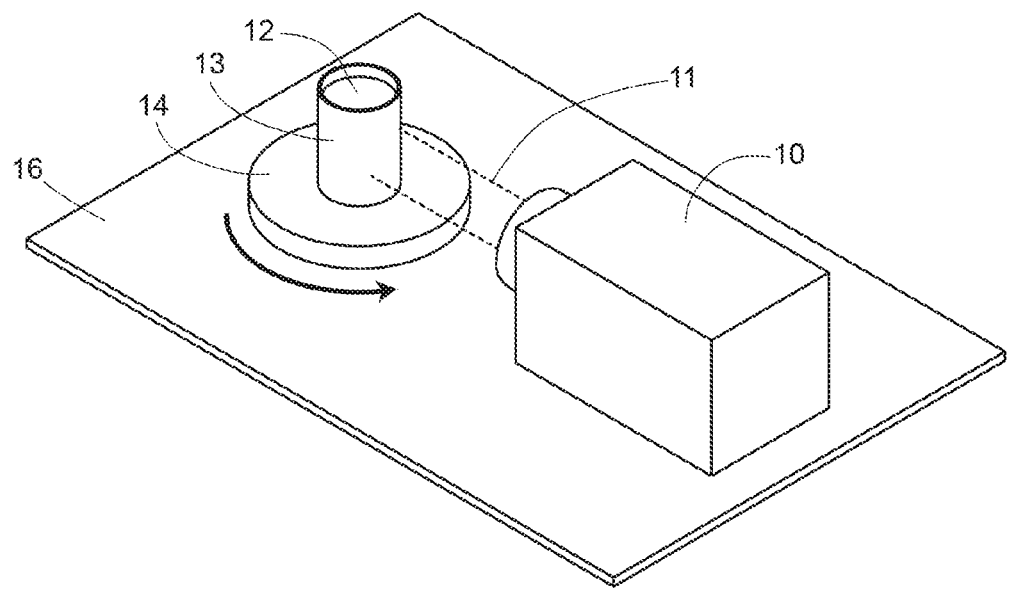
FIG. 1A is a perspective view of one example embodiment of an apparatus of the present invention.

In this section, we disclose our invention in more detail, with reference to the attached drawings. This section is intended to illustrate particular embodiments of the invention, and should not be interpreted as limiting of the invention. In some cases, the terms "for example" are used as a reminder that the possible embodiments are given by way of example and not by way of limitation.

The present invention provides methods and apparatus for the fabrication of three-dimensional objects by tomographic back-projections. Briefly, and in general terms, the invention comprises representing the three-dimensional object to form by a series of projections along different angles, similarly to the back-projections in computed tomography, and irradiating a photoresponsive material at these angles with light patterns computed from these projections, in order to physically fabricate the object within the photoresponsive material. The photoresponsive material is a material that can alter its material phase in response to irradiation with light. The alterations that the photoresponsive material could possibly undergo when irradiated by light include, but are not limited to, solidification, gelation, liquefaction or solubilization. The methods described herein provide a means for the alteration of a whole volume of a photoresponsive material in a relatively short time (for example 1 s, 10 s or 30 s), thus resulting in fast production and more isotropic mechanical properties of the fabricated object. Depending on the particular photoresponsive material that is used for this process, the fabricated object may have properties that include, but are not limited to, softness or elasticity.

In a preferred embodiment of this invention, the build region is set into a continuous rotational motion while being concurrently irradiated by a sequence of spatially modulated light patterns (generated as described above) to form an object. The spatially modulated light patterns are irradiated following an optical axis orthogonal to the axis of rotation of the build region. Furthermore, in a preferred embodiment of the invention, the spatially modulated light patterns are two-dimensional and centered on the axis of rotation of the build region. In at least one embodiment of the present invention, the irradiation of the build region by the sequence of spatially modulated light patterns is synchronized with the rotational motion of the build region.

In order to irradiate the whole build region, the optical absorption length of the photo-curing radiation in the photoresponsive material can be tuned to be longer than the build region width. Owing to the continuous rotational motion of the build region and the optimized absorption length of light in the photoresist, a local volume of the build region is irradiated by a series of different light intensities. Thus, if the local volume is part of the object to form, the spatially modulated light patterns irradiating the local volume are computed so that the total effective dose absorbed in the local volume is above the phase alteration threshold of the material. Conversely, if the local volume is not part of the object to form, the spatially modulated light patterns irradiating the local volume are computed so that the local dose is below the phase alteration threshold of the material. In a preferred embodiment of the invention, the object is formed after one revolution of the build region. Thus, the phase of a local volume of material is altered from multiple irradiation angles, which confers isotropic mechanical properties to the object.

The methods of the invention include the computation of the spatially modulated light patterns displayed at different angles during the build region's rotational motion.

In at least one embodiment of the invention, the build region is fixed and the spatial light modulator is rotating around it.

In at least one embodiment of the invention, the photoresponsive material is sensitive to two different radiation wavelengths.

In at least one embodiment of the invention, the phase alteration of the photoresponsive material is initiated through irradiation with a first radiation wavelength and inhibited through irradiation with a second radiation wavelength. In a further embodiment, the phase alteration of one material by a first wavelength is independent to the phase alteration created by the second radiation wavelength thus creating two materials with different physical, mechanical or chemical properties.

The rotation speed of the rotating part in the different embodiments may be, but is not limited to, one revolution per second.

In at least one embodiment of this invention, the build region is controlled in temperature.

In at least one embodiment of this invention, the humidity of the build region is controlled.

In at least one embodiment of this invention, the content of the atmosphere of the build region is controlled. The atmospheric control can include, but is not limited to, the control of the carbon dioxide content, or of the oxygen content, or of the nitrogen content, or any combination thereof.

Thus, a particular aspect of the invention is a method of forming a three-dimensional object. In general, and given the aforementioned elements, the method comprises the steps of:

(a) providing an optically transparent vessel which defines the build region;

(b) filling the build region with a photoresponsive material, the material being in contact with the walls of the optically transparent vessel;

(c) computing one or more sequences of spatially modulated light patterns of one or more radiation wavelengths;

(d) setting either the build region or the projection device, a spatial light modulator, into a rotational motion;

(e) concurrently irradiating the build region with one or more synchronized spatially modulated light patterns to selectively alter the phase of the photoresponsive material in order to form an object;

(f) in the case of the fabrication of a multi-material three-dimensional object, the uncured light-reactive material is removed from the build region, the build region is filled with an other light-reactive material and the steps (c), (d), (e) are repeated.

Hence, the methods of the present invention have the advantage of having no mechanical element into the build region, which reduces the risk of contaminating the build region with harmful materials. Moreover, the present invention is strictly non-invasive as the formation of an object is based on light absorption. Therefore, in at least one embodiment of the invention, the optically transparent vessel defining the build region is sterilized and disposable in order to perform biological operations with the fabricated object such as, but not restricted to, biological organs.

Moreover, the formation of the volume of the object at once and the absence of mechanical actuation into the build region have the advantage of speeding up the fabrication process, of reducing the risk of distortion of the end part and of conferring isotropic mechanical properties to the end part.

1. Preferred Embodiment

Figure 1B:
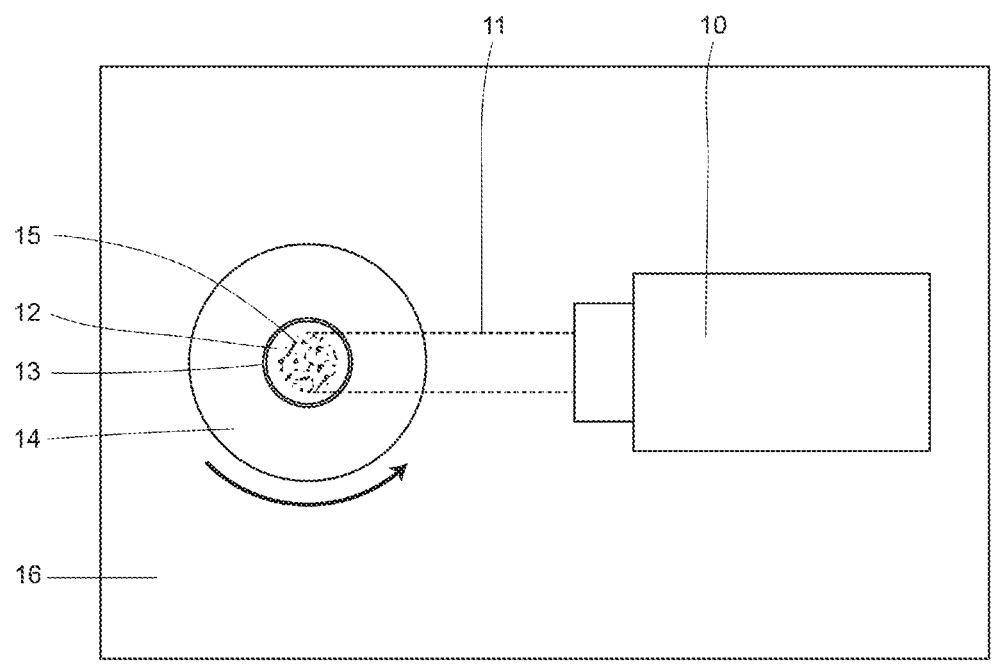
FIG. 1B is a top view of the apparatus of FIG. 1.

A preferred embodiment of the present invention is shown in FIG. 1. FIG. 1A is a perspective view and FIG. 1B is a top view.

A projection unit 10 generates controllable patterns of light 11, which are directed to a photoresponsive material 12. The photoresponsive material 12 is held inside a container 13 that is optically transparent to the wavelength of the light. This container 13 is fixed on a rotating platform 14, so that the orientation of the photoresponsive material 12 relative to the beam of light 11 may be controllably varied in one or both rotation directions, either continuously or in incremental steps. As the photoresponsive material 12 is rotated, a pattern (not shown in FIG. 1A) generated by the projection unit 10 is varied so that the desired volumes of the photoresponsive material 12 are being illuminated. In FIG. 1B, the parts of the photoresponsive material 12 that have been altered are represented with black spots 15. The various components of this embodiment are mounted on a support structure 16, whose particular design is not critical and can assume a variety of configurations.

The container 13 and the photoresponsive medium 12 together form the build volume. The container 13 may for example be a cylindrical vial made of glass or plastic or any light-transparent material. The build region may for example be 1 cm wide to 15 cm wide and 1 cm tall to 15 cm tall.

The optical absorption length at the wavelength of the photo-altering radiation in the photoresponsive material 12 may for example be tuned to be longer than the build volume width.

The projection unit 10 is a device that may generate spatial patterns of light. The projection unit 10 may for example include a directly modulable light source such as an LED array, or it may include a light source with a fixed spatial profile (such as a laser or an LED) combined with a spatial light modulator. The spatial light modulator may consist of galvanometer-scanners, a liquid crystal spatial light modulator, or a digital micromirror device (DMD). The generated patterns of light may be zero-dimensional (spots), one-dimensional (lines), two-dimensional (images), or three-dimensional (holograms). One skilled in the art will understand that the projection unit 10 may incorporate additional optical elements, for example a cylindrical lens to correct for the distortion caused by a cylindrical container, or relay lenses to accurately project the light patterns inside the build volume.

2. Illustration of the Principle Behind the Method

The reason for varying the orientation of the photoresponsive material relative to the projection unit is schematically illustrated in FIG. 2, i.e., FIGS. 2A and 2B. When a beam of light 20 is directed into a static container 21 of photoresponsive material 22, the length over which the photoresponsive medium 22 is affected cannot be controlled precisely. As shown in FIG. 2A, the beam of light 20 affects the photoresponsive material 22 over the entire length of the container 21. This yields a 3D printed object whose two-dimensional profile in a plane transverse to the direction of beam of light 20 can be controlled, but whose depth profile along the direction of propagation of the beam of light 20 is uncontrollable and extends over the entire depth of the container. In this example, the resulting object is shown in FIG. 2B.

The basic principle of the present invention is illustrated in FIG. 3, i.e., FIGS. 3A-3J. In FIG. 3A, a section of the photoresponsive material 30 and its container 31 is shown. The container 31 can be rotated (as indicated by the arrow). A beam of light 32 is directed inside the container 31. Hence, a certain dose of light is deposited inside the photoresponsive material 30. This dose is represented by a grey shaded area in FIG. 3B. The projection of light is interrupted after a short time, such that the photoresponsive material 30 is not yet converted to its alternate form. For example, if the photoresponsive material 30 is a photopolymer material that polymerizes under illumination by a radiation, the projection is halted at an illumination dose that is well below the polymerization threshold. The sample is then rotated as shown in FIG. 3C. The volume that was previously illuminated has now changed orientation with respect to the direction of illumination, as shown in FIG. 3D. The photoresponsive material 30 is then be illuminated from a different direction, as shown in FIG. 3E. In doing so, it is possible to expose certain volumes of the photoresponsive material again (represented with a darker shading in FIG. 3E), while other volumes of the sample receive only a single, low exposure dose (lighter shading in FIG. 3E). After the second exposure, the process can be repeated by rotating the sample more, as shown in FIG. 3F and FIG. 3G, and illuminating the photoresponsive material from a new orientation, as shown in FIG. 3H. The accumulation of all the projections from all the different orientations determines which parts of the photoresponsive material received enough illumination to be converted to an alternate form, as exemplified by the dark shaded area in FIG. 3I, and which parts are insufficiently exposed to be converted, as exemplified by the lighter shaded areas in FIG. 3I. It is understood that the process explained here may also be done with smaller steps of rotation, or even with a continuous rotating motion. After development of the photoresponsive material, a structure can be extracted from the photoresponsive material 31 as illustrated in FIG. 3J. By modulating the light beam 32 in an appropriate fashion while the photoresponsive material 30 rotates, a controlled distribution of light dose is applied to the photoresponsive material 30.

While FIG. 3A to FIG. 3J illustrate only one section of the photoresponsive material 30 for clarity, it is understood that this process may be carried out concurrently for several layers of the photoresponsive material 30. The distribution of the illumination dose can be controlled independently in each layer, thereby allowing three-dimensional structures to be created.

3. Computation of the Light Patterns

The light patterns used for the formation of the three-dimensional object can be digitally computed, for example as follows: in a first step, the line integral of the density of a computer-designed three-dimensional model of the object is computed along different projection angles. These projections are made along an axis orthogonal to the rotation axis of the build region and for a series of rotation angles of the object to form. In a second step, the obtained series of digital patterns are then filtered to equalize the dose of the volume to cure and to sharpen the object edges. After computation, these digital patterns are generated with one of projection units described in section 1 and back-projected during the rotational motion of the build volume to form the object. To those skilled in the art, this computation method may be otherwise described as taking the Radon transform of a three-dimensional digital model of the object to form, filtering the transform with a Ram-Lak filter to compensate for the radial blur of the projections, and finally back-projecting the filtered patterns onto the build region to produce the object. It is to be understood that other tomographic computation methods can be used to generate the light patterns, for example fan-beam algorithms followed by a tomographic reconstruction filtering, cone-beam algorithms followed by a tomographic reconstruction filtering, convolution-backprojection, iterative reconstruction techniques, algebraic reconstruction techniques, or diffraction tomography algorithms with the Born or Rytov approximation (see for example A. C. Kak, M. Slaney, "*Principles of Computerized Tomographic Imaging*", IEEE Press, 1988).

Furthermore, additional constraints can be imposed on the generation of the light patterns, for example positivity, without deviating from the scope of the present disclosure.

Additionally to defining the three-dimensional object, the sequence of spatially modulated light patterns can be corrected to account for various spurious effects, such as the sedimentation of the photoresponsive material during the curing process, the eccentricity and misalignment of the build volume with the irradiation axis, or the absorption of light inside the photoresponsive material.

4. Composition and Use of the Photoresponsive Material

The methods and apparatus described in the present invention use a photoresponsive material to form the three-dimensional object. In a preferred embodiment of this invention, the photoresponsive material comprises, but is not limited to, a prepolymer, a photo-initiator that interacts with light to alter the material phase of the photoresponsive material, optionally a chain extender to confer elastic properties to the material, optionally a reactive diluent to reduce the viscosity of the photoresponsive material, optionally a pigment or dye that absorbs light from the projection unit, optionally a filler to modify the modulus and strength of the formed three-dimensional object, or a combination of these components. The phase of the photoresponsive material prior to the irradiation by the sequence of patterns of light can be, but is not limited to, that of a liquid, of a gel, or of a solid.

In a further preferred embodiment, said photoresponsive material comprises a dynamic viscosity between 1000 and 50000 centipoises at a temperature of 25° C.

In at least one embodiment of the invention, the photoresponsive material is a biocompatible material seeded with cells or biologically relevant components. Indeed, engineered tissues are an increasingly important tool in medical and pharmaceutical research. By combining the proper stem cells, materials and biochemical components, it is possible to grow organoids in vitro that closely resemble their natural tissue counterparts. These organoids can then be used as models to study diseases and screen drugs. A central challenge in tissue engineering is how to provide the correct three-dimensional microenvironment for the stem cells to grow. The way in which stem cells reproduce and differentiate is strongly influenced by the external conditions in which they evolve. Amongst others, the material properties and geometry of the extra-cellular matrix is a key factor. Using the methods and apparatus of the present disclosure with a photoresponsive medium containing biologically relevant components, one may create objects that provide the desired environment for growing cells into organoids or engineered tissues.

In at least one embodiment of the invention, the photoresponsive material is loaded with solid particles such as ceramic particles, metallic particles, polymeric particles or any combination thereof.

In at least one embodiment of the invention, the photoresponsive material optionally contains one or more dyes or pigments that absorb light radiation at different wavelengths than the wavelength or the wavelengths of the projection unit.

In at least one embodiment of the invention, the composition of the photoresponsive material is such the formed three-dimensional object can be in part or wholly electrically conductive.

In at least one embodiment of the invention, the composition of the photoresponsive material is such that parts or the whole of the formed three-dimensional object can be bioresorbable in a living body. An example of such a bioresorbable photoresponsive material is a mixture of methacrylated poly(1,12 dodecameth-ylene citrate) and diethyl fumarate with a bis(2,4,6-trimethylbenzoyl)-phenylphosphineoxide (van Lith, R., Baker, E., Ware, H., Yang, J., Farsheed, A. C., Sun, C. & Ameer, G. 3D-Printing Strong High-Resolution Antioxidant Bioresorbable Vascular Stents. *Adv. Mater. Technol.* 1, 1600138 (2016)).

In at least one embodiment of the present invention, the photoresponsive material is such that it can be used to form three-dimensional objects that can be dissolved by applying for example a change in temperature, a change in the acidity of the three-dimensional object, a chemical treatment, or a combination thereof. Such a photoresponsive material can be used advantageously with the present invention to form sacrificial molds for casting applications. An example of a liquid photoresponsive material whose phase can be first altered to form a solid three-dimensional object, and second whose solid phase can be further altered to form a liquid through a heat treatment is comprised of 80% (v/v) trimethylolpropane triacrylate, 20% (v/v) poly(methyl methacrylate)-15 kDa and bis(2,4,6-trimethylbenzoyl)-phenylphosphineoxide. The solid three-dimensional object formed with this example of resin can be melted by placing the object in an oven heated at more than 160° C. for a time duration comprised between, but not limited to 15 minutes and one hour.

In at least one embodiment of the present invention, the photoresponsive material can contain a plurality of photo-initiatiors sensitive to different parts of the light spectrum. Such a composition of the photoresponsive material could be used advantageously with the methods and apparatus of the present invention to form a three-dimensional object in several steps. For example, the photoresponsive material can first be irradiated with a sequence of patterns of light at a first radiation wavelength, to which at least one photo-initiator contained in the photoresponsive material is sensitive, in order to form the three-dimensional object. Second, the formed three-dimensional object can be irradiated with a light source emitting at another wavelength to which another photo-initiator contained in the photoresponsive material is sensitive. The irradiation process can be repeated with light sources emitting at wavelengths adapted to the different photo-initiators contained in the photo-responsive material. An example of a photo-responsive material that can react to several wavelengths of light is a mixture of 80% (v/v) trimethylolpropane triacrylate, 20% (v/v) poly(methyl methacrylate)-15 kDa, bis(2,4,6-trimethylbenzoyl)-phenylphosphineoxide as a first photo-initiator sensitive to blue light, and 1-hydroxy-cyclohexyl-phenyl-ketone as a second photo-initiator sensitive to ultraviolet light.

5. Multiple Projection Units

Figure 4:
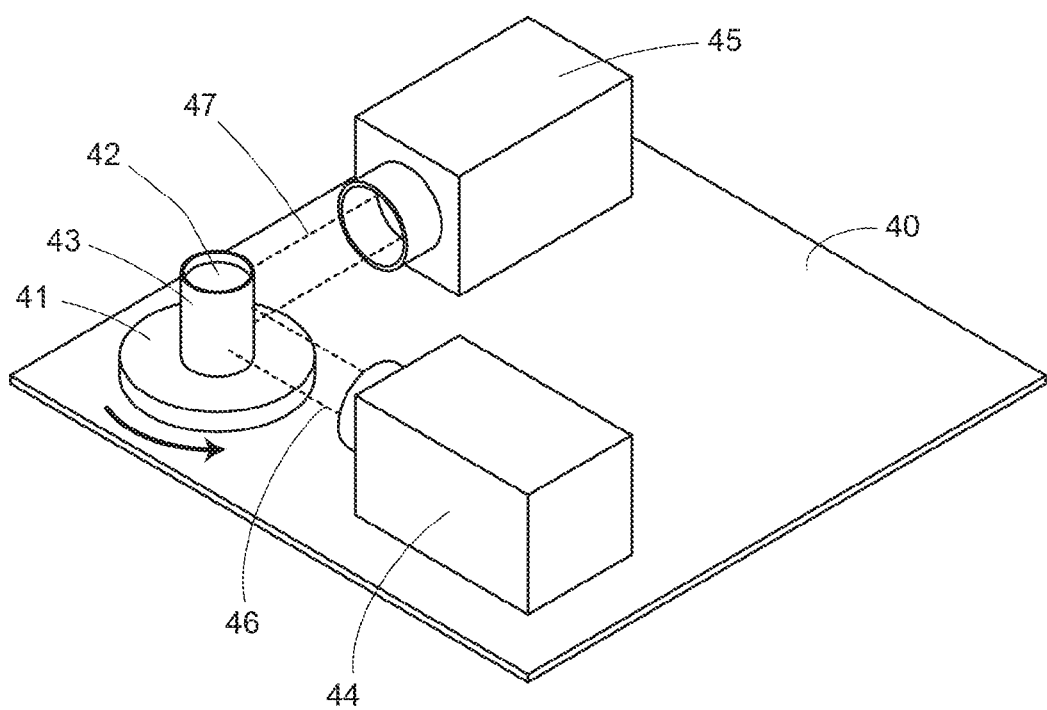
FIG. 4 is a perspective view of an alternate embodiment of an apparatus using two different projection units.

An alternate embodiment of an apparatus of the present invention is shown in FIG. 4. A frame 40 supports a rotation platform 41 that can be controllably rotated. A photoresponsive material 42 is held inside a container 43 that is located on the rotation platform 41. The frame also supports two separate projection units 44 and 45. Both projection units apply independently controllable light patterns 46 and 47 to the photosensitive material 42 through the container 43, which is optically transparent to the illumination beams. In this embodiment, both projection units are oriented within the plane of rotation of platform 41.

Figure 5:
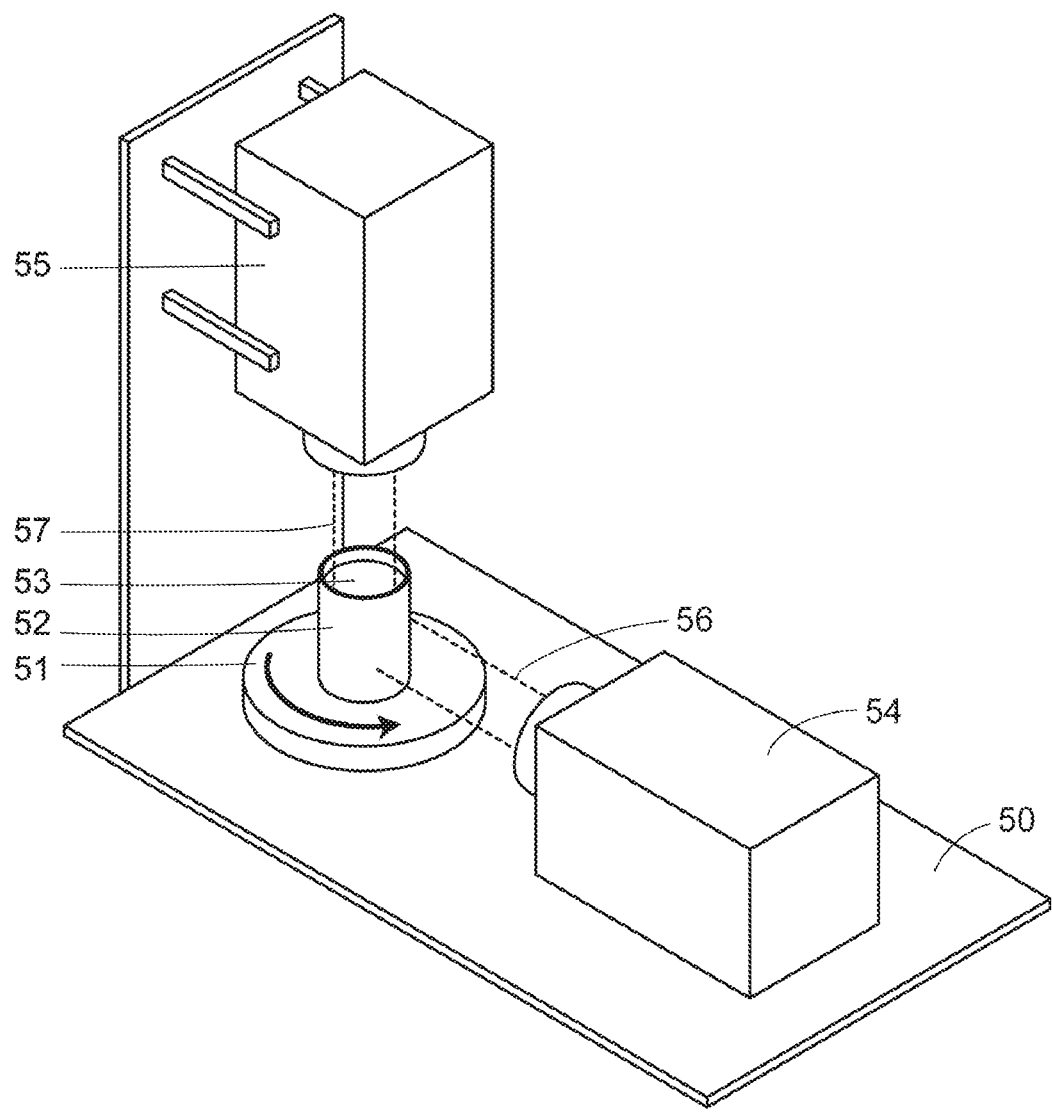
FIG. 5 is a perspective view of an alternate embodiment of an apparatus using two different projection units, with one of the said projection units mounted along the axis of rotation of the rotating platform.

An alternate embodiment of an apparatus of the present invention is shown in FIG. 5. A frame 50 supports a rotatable platform 51, such that the container 52 and the photoresponsive material 53 therein can be controllably rotated. Two separate projection units 54 and 55 are mounted in such a way that one projection unit 54 is oriented within a plane of rotation of the rotation platform 51, while the other projection unit 55 is oriented perpendicular to this plane of rotation. Each projection unit can generate independently controllable patterns of light 56 and 57, which are directed towards the photoresponsive material 53.

6. Multiple Wavelengths

In an alternate embodiment, part of the light patterns can be displayed at a first wavelength, and part of the light patterns can be displayed at a second wavelength of light. Accordingly, the photoresponsive material can be designed to have a different response to each radiation wavelengths.

The light patterns at each wavelength can be created by separate projection units, as in the embodiments illustrated in FIG. 4 and FIG. 5. Alternately, a single projection unit can be devised so that it is capable of projection at different wavelengths, yielding a configuration as was illustrated in FIG. 1. For example, one could integrate multiple light sources of different wavelengths into a single projection unit.

When using a photoresponsive material with a different response for each wavelength, the build volume can be affected in a different way by the light patterns at each wavelength. For example, the phase alteration of the photoresponsive material can be initiated through irradiation with a first radiation wavelength and inhibited through irradiation with a second radiation wavelength. An example of such a photoresponsive medium is a mixture of a photochromic spirothiopyran and a N-ethyl maleimide copolymer (H. Vijayamohanan, E. F. Palermo, and C. K. Ullal, "A Spirothiopyran Based Reversibly Saturable Photoresist," *Chemistry of Materials*, p. 4754-4760, 2017). Briefly, upon irradiation with ultraviolet radiation at 365 nm, the mixture will start polymerizing through a Michael addition reaction. If the mixture is concurrently irradiated with green radiation at 532 nm, the polymerization reaction will be inhibited. As another example, photoresponsive material can be designed to undergo alteration only through a two-step initiation process: if the light-reactive mixture is locally concurrently irradiated with two specific radiation wavelengths, the phase of the local volume of material will start being altered; otherwise, if the local volume is irradiated with only one of the specific radiation wavelength, the phase of the local volume of material is not altered.

Thus, the present invention includes the irradiation process of a photoresponsive material that is sensitive to two or more different radiation wavelengths, in order to form an object. The fabrication of the object is then performed by setting the build volume into a continuous rotational motion while concurrently irradiating it with multiple sequences of spatially modulated light patterns, each with a different radiation wavelength. The sequences of spatially modulated light patterns can be produced by the same spatial light modulator and projected through the build volume along the same optical axis, or the sequences of spatially modulated light patterns can be produced by different spatial light modulators and projected through the build region along different optical axes.

7. Extending the Build Volume

Figure 6:
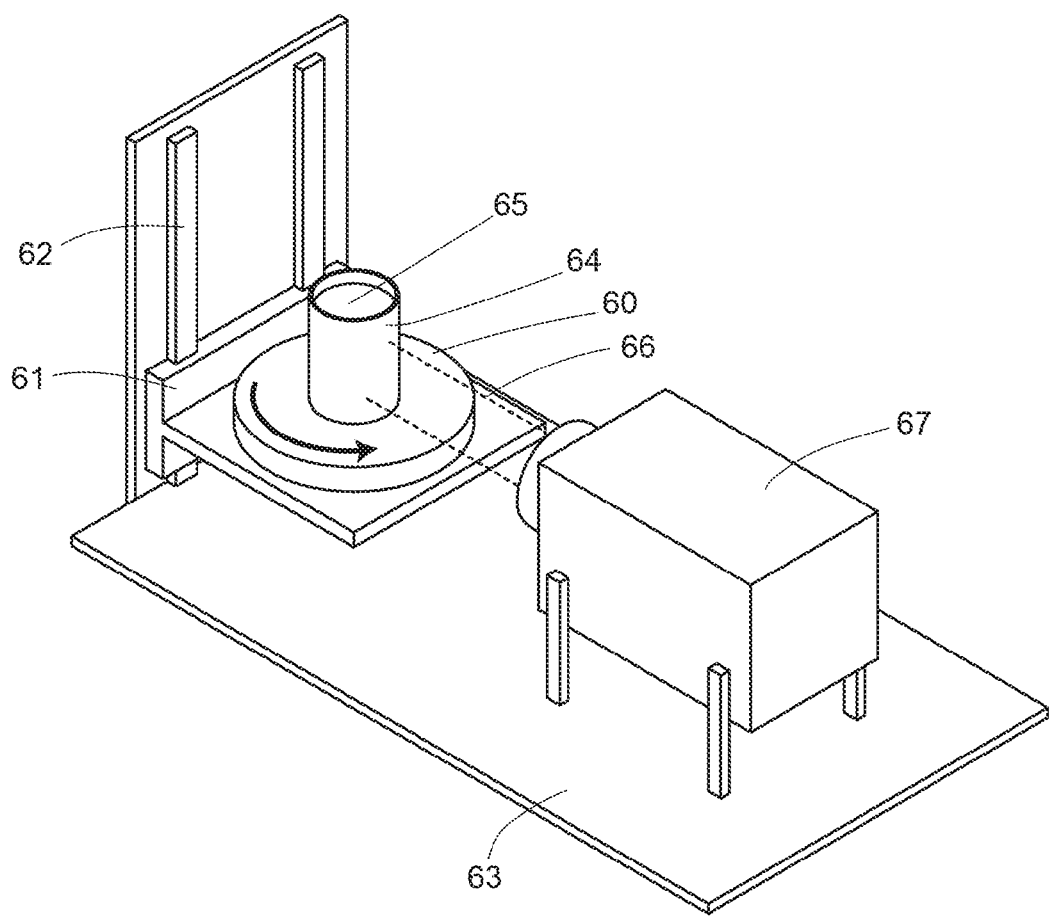
FIG. 6 is a perspective view of an alternate embodiment of an apparatus featuring an additional vertically translating platform, which can move the build volume through the field of illumination of the projection unit.

An alternate embodiment of an apparatus of the present invention is shown in FIG. 6. Here, the controllably rotatable platform 60 is mounted on a motion platform 61 which can be controllably translated along a vertical support 62, itself fixed to a frame 63. This allows exposing different parts of the container 64 and the photoresponsive material 65 therein to the illumination pattern 66 coming from the projection unit 67, which is also fixed to the frame 63. This embodiment illustrates how one can extend the volume of addressable photoresponsive material beyond the limits of the field of illumination of the projection unit.

8. Stationary Build Volume

Figure 7:
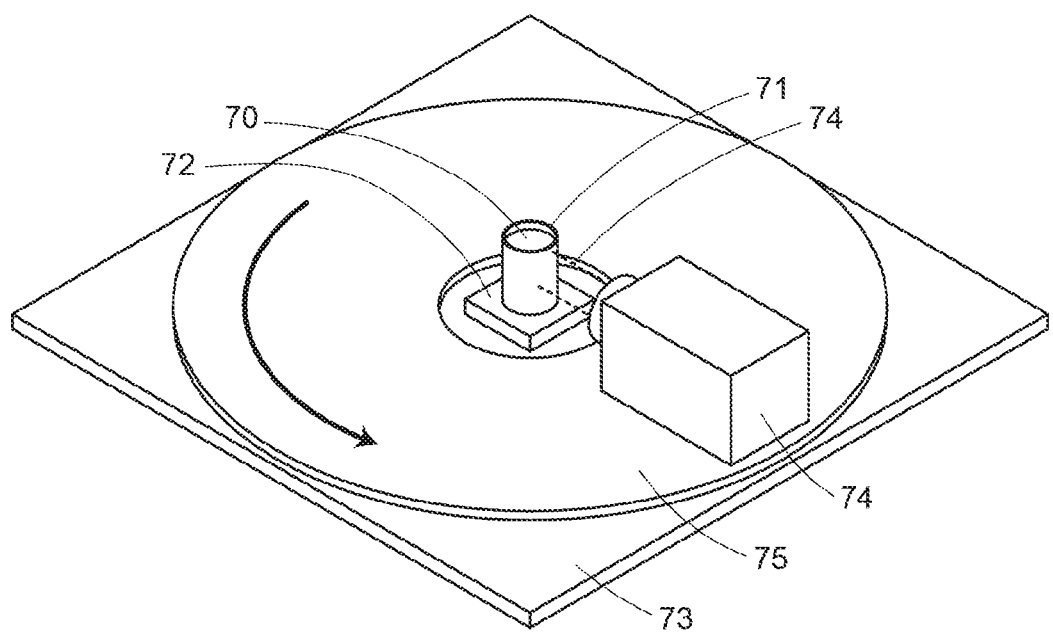
FIG. 7 is a perspective view of an alternate embodiment of an apparatus where the projection unit is mounted on a rotating platform while the build volume remains fixed.

An alternate embodiment of an apparatus of the present invention is shown in FIG. 7. Here, the photoresponsive material 70 and its container 71 are placed on a stationary support 72 which is fixedly attached to the frame 73. In this embodiment, the projection unit 74 is attached on a controllably rotatable platform 75. This embodiment shows how the method of the present invention can be applied without motion of the build volume.

9. Atmosphere and Temperature Control

Figure 8:
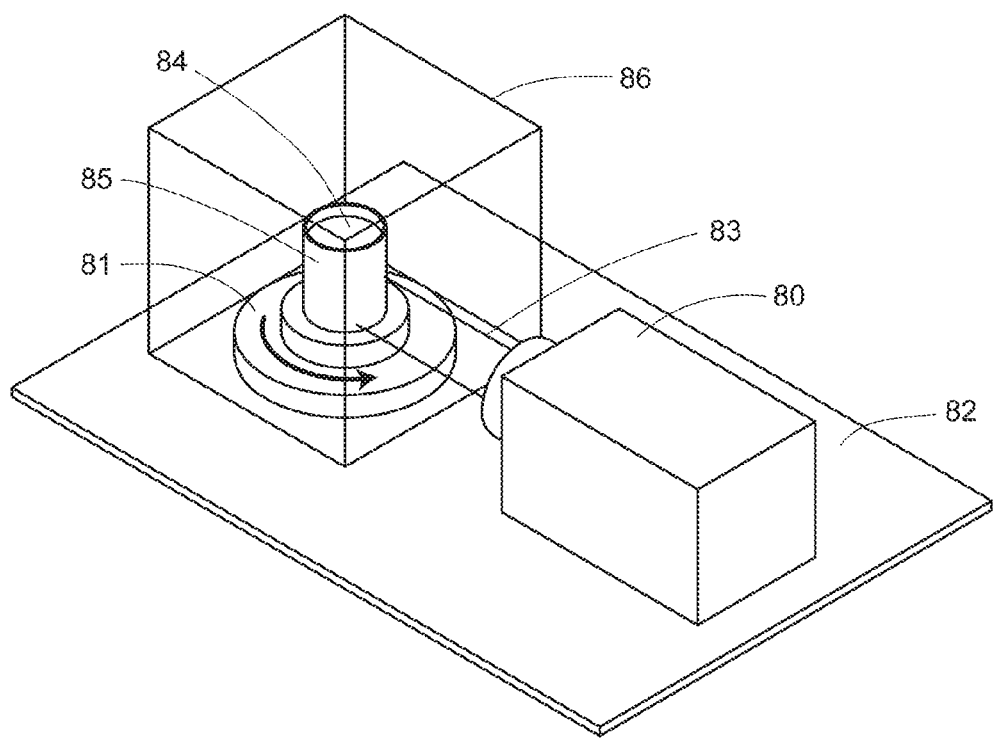
FIG. 8 is a perspective view of an alternate embodiment of an apparatus where the atmosphere and temperature of the build volume can be controlled.

An alternate embodiment of an apparatus of the present invention is shown in FIG. 8. A projection unit 80 and a controllably rotatable platform 81 are supported by a frame 82. The projection unit emits a controllable beam of light 83 in the direction of the photoresponsive material 84 and its container 85. In this embodiment, the apparatus comprises a means 86 for regulating the atmosphere and temperature of the photoresponsive material 84. The means for regulating the atmosphere and temperature can be used to concurrently and independently, either heat or cool the photoresponsive material, or increase or decrease the moisture of the photoresponsive material, or change the relative pressure of atmospheric gases in the photoresponsive material. Such control of the atmospheric content and temperature of the build volume may affect its physical properties, such as viscosity, and its chemical properties, such as the rate of conversion of the photoresponsive medium, and its viability as a biological substrate.

10. Fabrication Process

Figure 9:
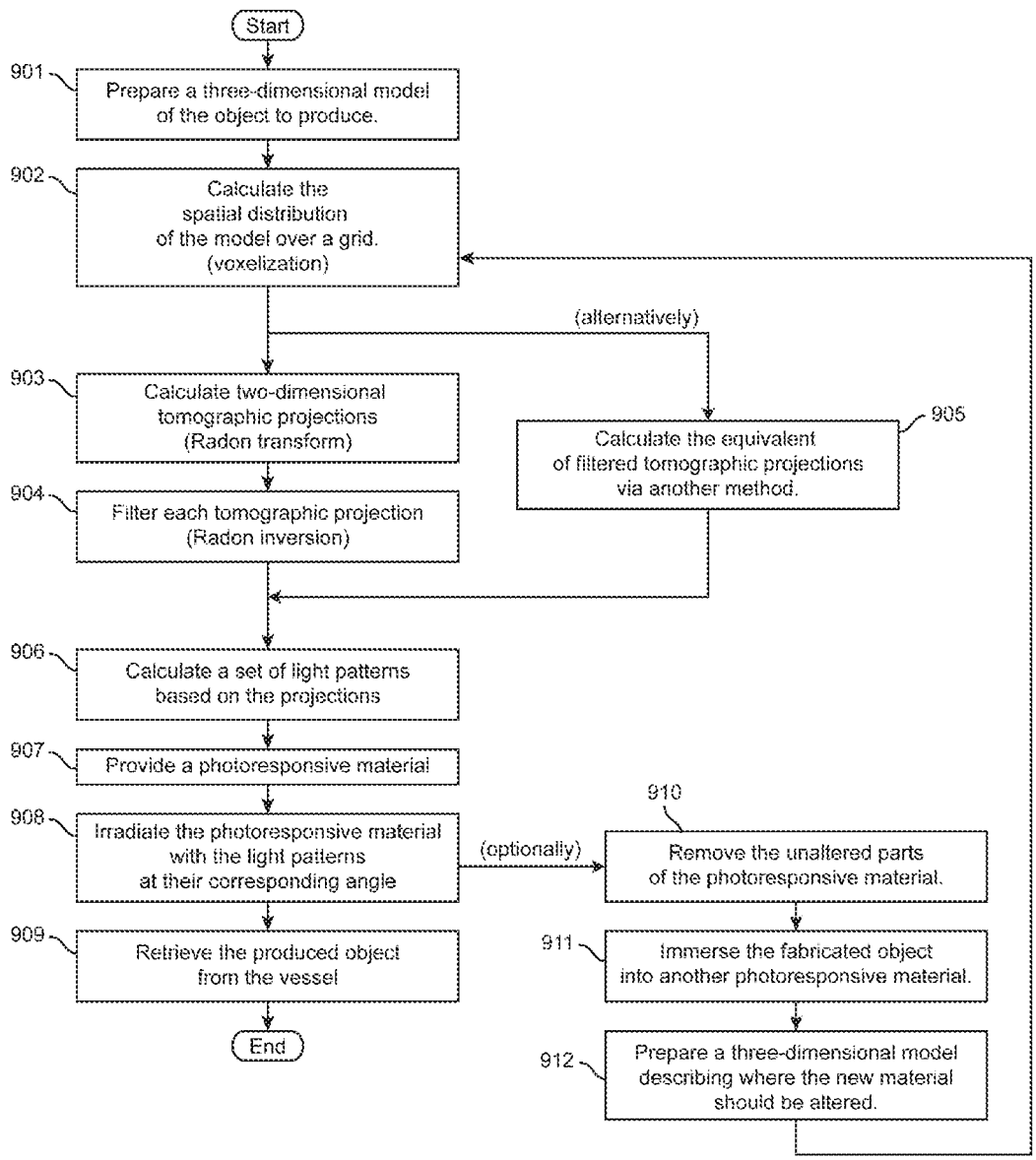
FIG. 9 is a flow chart illustrating the basic concepts employed to perform the method of three-dimensional fabrication by tomographic back-projections of the present invention.

FIG. 9 is a flow chart that illustrates a process for three-dimensional fabrication of an object by tomographic back projections. The process includes preparing a three-dimensional (3D) model of the object to fabricate (901). For example, a computer file containing the 3D model in any suitable computer-aided design (CAD) format, such as STL or STEP, can be loaded. Next, the spatial distribution of the object is computed over a 3D grid (902), a step that is sometimes referred to as "voxelization". In the next step, a set of tomographic projections of the spatial distribution are calculated (903) along various directions. This step could be described in technical terms as taking the Radon transform of each slice of the 3D grid representing the object's distribution. These tomographic projections are then filtered (904) so that if they would be projected back onto an empty 3D grid, the cumulative sum of all the filtered projections would reproduce the desired spatial distribution of the object. This process is known as Radon inversion. The filter is also known as the "filtered backprojection formula", "Ram-Lak filter" or "ramp filter". As an alternative to steps 903 and 904, any other computation method may be used to obtain the equivalent of filtered tomographic projections (905). Examples of alternative algorithms are described in the present disclosure under the paragraph "Computation of the light patterns". Next, a set of light patterns are computed based on the filtered projections (906). This step may comprise, for example, discarding negative values of the filtered projections, converting the filtered projections to an 8-bit digital format so that it can be displayed by a projection unit, or converting the projections to a negative pattern if the photoresponsive material is for example a positive photoresist. In the next step, a volume of photoresponsive material should be provided (907) where the object will be fabricated. Subsequently, the photoresponsive material is irradiated with each light pattern at its corresponding angle of incidence (908). This leads to a distribution of alterations inside the photoresponsive medium that reproduces the object's distribution as calculated in step 902. After this, the fabricated object can be retrieved (909).

Optionally, extra steps can be undertaken for the fabrication of a multi-material object. For this, the process further includes removing the unaltered parts of the photoresponsive medium from the formed three-dimensional object (910). Then, the formed three-dimensional object is immersed into another photoresponsive material (911). A new 3D model is loaded to describe where this new photoresponsive material should be altered (912). Finally, the process is continued for the new material at step 902 until step 908 as described above. The multi-material object can then be retrieved (909), or a new material can be added again by continuing the process at step 910.

11. Examples

Figure 10:
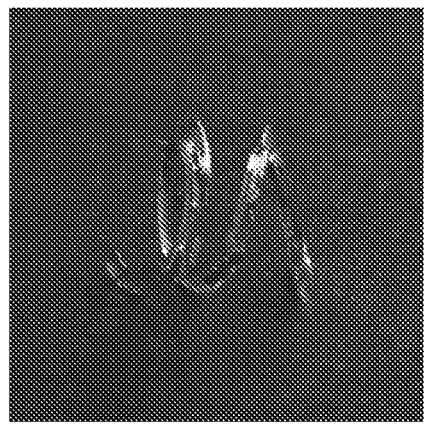
FIG. 10-15 are photographs of objects fabricated using the method and system of the present invention.
Figure 11:
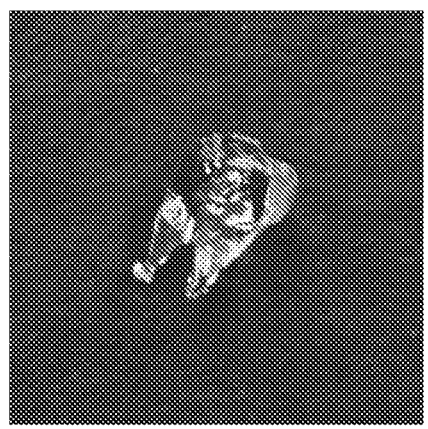
Figure 12:
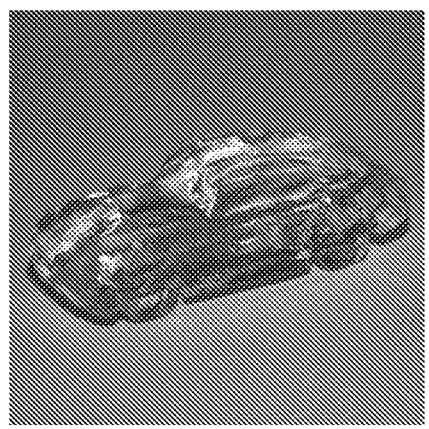
Figure 13:
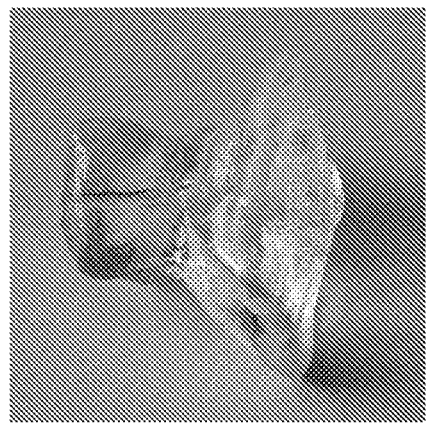
Figure 14:
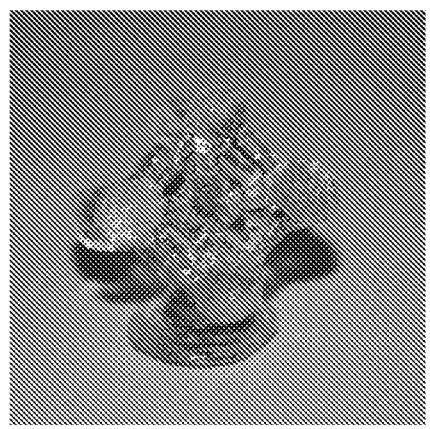
Figure 15:
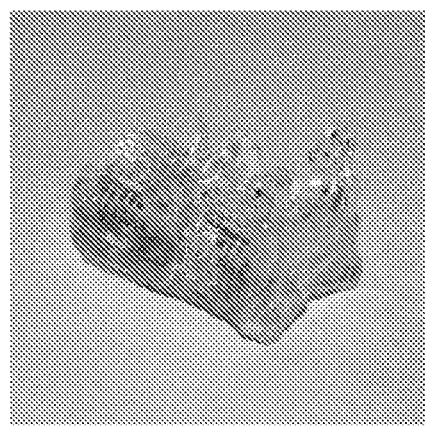

The process described previously was demonstrated by creating various objects. For example, a spring is shown in FIG. 10 and a tooth model in FIG. 11. The preceding objects were printed starting from a resin composed of trimethylolpropane triacrylate, poly(methyl methacrylate), camphorquinone and ethyl-4-dimethylamino benzoate. The printing time was 40 seconds and the size of the objects is approximately 1 cm in the largest dimension. Further examples of printed objects are a model of a car in FIG. 12, an ear mold for a hearing aid or earphone device in FIG. 13, a representation of a body-centered crystal system in FIG. 14, and a model of a cathedral in FIG. 15. The objects in FIGS. 12 to 15 were printed starting from a resin composed of trimethylolpropane triacrylate, poly(methyl methacrylate), and bis(2,4,6-trimethylbenzoyl)-phenylphosphineoxide. The printing time was 30 seconds and the size of the objects is approximately 2 cm in the largest dimension.

12. Feedback

Figure 16:
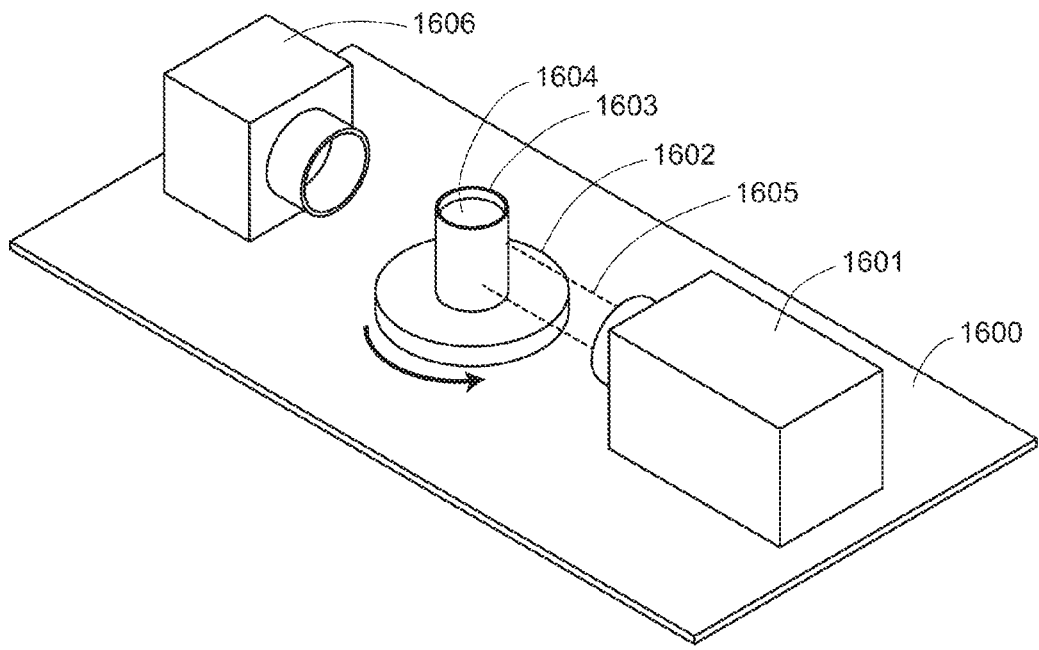
FIG. 16 is a perspective view of an alternate embodiment where an imaging system records the alterations of the photoresponsive medium in order to provide feedback for the generation of light patterns.

An alternate embodiment of an apparatus of the present invention is shown in FIG. 16. A frame 1600 supports a projection unit 1601, a rotation platform 1602 and a vessel 1603 containing the photoresponsive medium 1604. As before, the photoresponsive medium is irradiated with a beam of light patterns 1605 while the relative orientation of this beam with the photoresponsive medium is controllably rotated. During the irradiation, an imaging system 1606 records the alterations of the photoresponsive medium. These recordings are used as feedback to adjust the subsequent light patterns during the irradiation, in order to attain the desired distribution of alterations inside the photoresponsive medium with higher accuracy.

The imaging method used to record the alteration of the photoresponsive medium can be for example phase contrast imaging, differential interference contrast imaging, holography or wide field imaging. The light used for the recordings can for example be the same light as used to alter the photoresponsive medium, a different light source, or ambient light.

Figure 17:
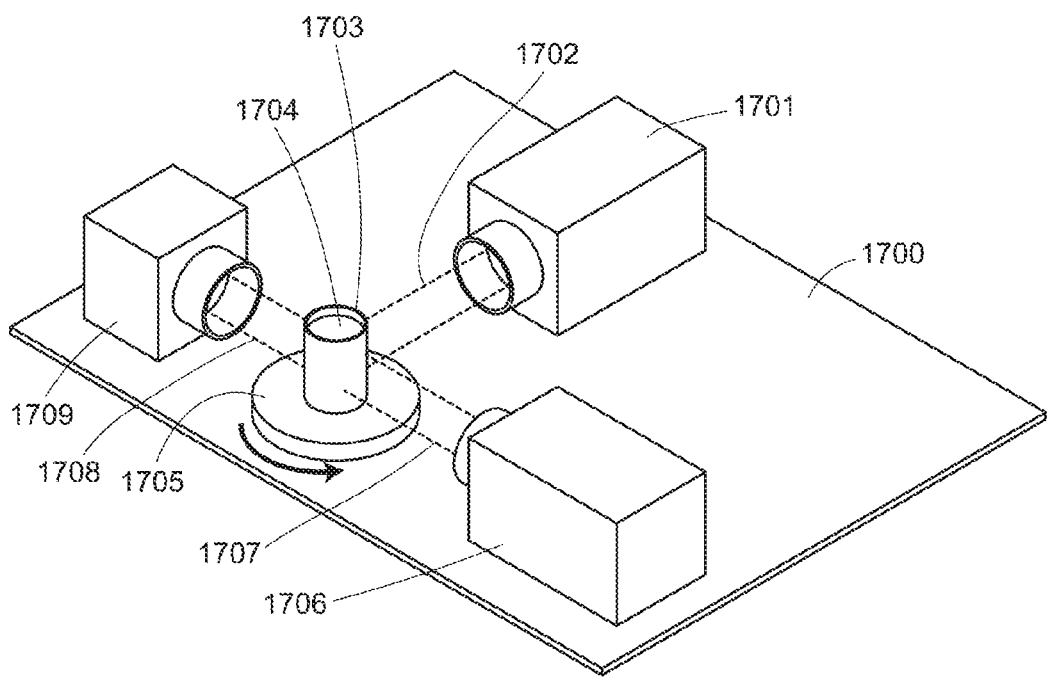
FIG. 17 is a perspective view of an alternate embodiment where a camera records the alterations of the photoresponsive medium and a secondary light source is used to illuminate the photoresponsive medium.

An alternate embodiment of an apparatus of the present invention is shown in FIG. 17. Here, a frame 1700 supports a projection unit 1701 which sends a beam of controlled light patterns 1702 into a vessel 1703 containing a photoresponsive medium 1704, the orientation of which is controllably varied by a rotation stage 1705. In this embodiment, an additional light source 1706 provides a separate light beam 1707, which is transmitted through the photoresponsive medium 1704. The resulting signal 1708 is recorded by an imaging system 1709. As in the previous embodiment, these recordings are used to adjust the light patterns dynamically during the fabrication procedure.

13. Automation

The system described in the present disclosure can be extended with a means for automatically feeding photoresponsive medium into the optically transparent vessel, or for automatically removing the photoresponsive medium from it after fabrication of the three-dimensional object, or both. Another possibility is to provide a continuous flow of photoresponsive medium through the optically transparent vessel (for example as described by K. S. Paulsen, D. Di Carlo, A. J. Chung, "Optofluidic fabrication for 3D-shaped particles", Nature Communications 6, article number 6976, 2015).

Figure 18:
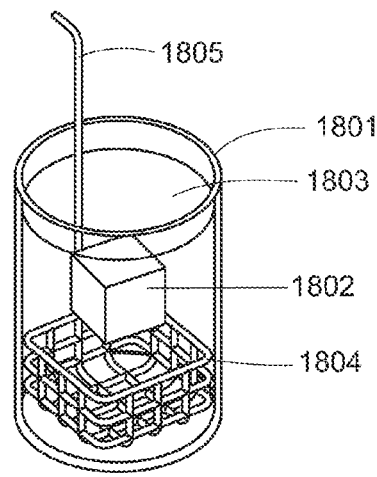
FIG. 18 is a perspective view of a system to extract the fabricated three-dimensional object from the photoresponsive medium after fabrication.

A means can be provided to remove the three-dimensional object from the build volume after fabrication, as illustrated for example by FIG. 18, where 1801 represents the transparent vessel, 1802 is the produced three-dimensional object, 1803 is the remaining photoresponsive medium, 1804 is a grated basket and 1805 is a handle to easily take the basket along with the three-dimensional object out of the transparent vessel.

14. Post-Processing of the Formed Three-Dimensional Object

The three-dimensional objects formed with the methods and apparatus of the present invention can be further processed, for example to clean the three-dimensional objects and reduce their tackiness. This can be done for example by immersing the three-dimensional objects in a container filled with isopropyl alcohol and sonicating the container for a time comprised between 30 s to 10 min.

Furthermore, parts of the initial photoresponsive material that were not altered by the sequence of patterns of light might stick to or be contained in the pores and tubes of the three-dimensional objects formed with the methods and apparatus of the present invention. Removal of this unaltered photoresponsive material from the three-dimensional object can be achieved by centrifuging the three-dimensional objects at relative centrifugal forces for example comprised between 25 g and 250 g, and for a time duration for example comprised between 30 seconds and 5 minutes.

Moreover, the three-dimensional objects formed with the methods and apparatus of the present invention can be strengthened by applying a heat treatment to the objects. If the three-dimensional object is made from a polymer-based photoresponsive material, a strengthening heat treatment can for example be comprised of the two following steps. First, the formed three-dimensional object is placed in an oven and heated to its glass transition temperature for a time duration comprised between, but not limited to, 15 minutes to 2 hours. Second, the oven is brought back to room temperature (around 20° C.) and the three-dimensional object is allowed to cool.

15. Reusability of the Photoresponsive Material

Figure 19:
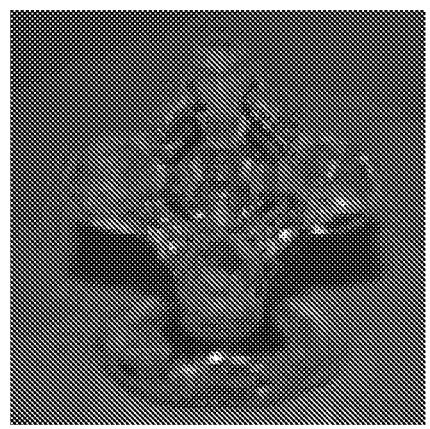
FIG. 19 is a photograph of a three-dimensional object fabricated using the methods and apparatus of the present invention with residual photoresponsive material from the fabrication of a first three-dimensional object.

In at least one embodiment of the present invention, the formation of a three-dimensional object within said build volume leaves unaltered parts of said photoresponsive material. The unaltered parts of the photoresponsive material can be collected after the formation of the three-dimensional object to be used for the formation of one or more other three-dimensional objects. FIG. 19 shows a three-dimensional object fabricated using the method and apparatus of the present invention and a photoresponsive material remaining from the fabrication of a first three-dimensional object with the methods and apparatus of this invention. The object in FIG. 19 is fabricated with a photoresponsive material composed of trimethylolpropane triacrylate, poly (methyl methacrylate), and bis(2,4,6-trimethylbenzoyl)-phenylphosphineoxide. The printing time was 30 seconds and the size of the object is approximately 2 cm in the largest dimension.

16. Elastomeric Organ Models

Figure 20:
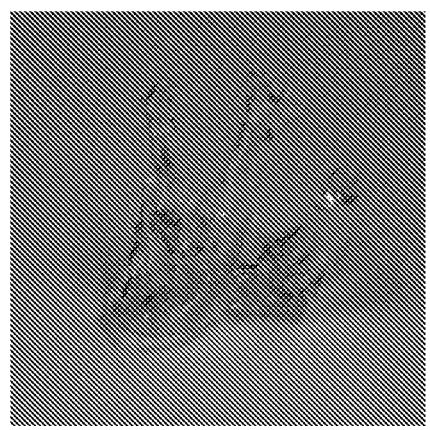
FIG. 20 is a photograph of a three-dimensional object based on computed-tomography scan of the pulmonary artery of a mouse, where the object is fabricated using the methods and apparatus of the present invention.
Figure 21:
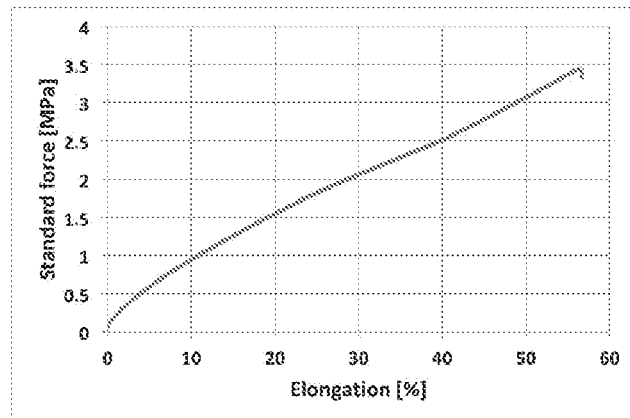
FIG. 21 is the result of a tensile measurement performed on the photoresponsive material used for the fabrication of the three-dimensional object of FIG. 20.

In at least one embodiment of the present invention, soft organ models can be fabricated based on measurement of the anatomy of living humans or animals. FIG. 20 shows a photograph of a three-dimensional object fabricated using the methods and apparatus of this invention. This object is based on the measurement of a pulmonary artery of a mouse with micro-computed tomography. The present invention allowing the fabrication of three-dimensional objects without any contact and without the need for support structures, it can be advantageously used to fabricate hollow structures or tubes such as the small pulmonary artery model illustrated in FIG. 20. The three-dimensional object shown in FIG. 20 is about 2.5 centimeters in its largest dimension and includes tubes with an inner diameter smaller than 600 micrometers. This object was further fabricated in 50 seconds with a photoresponsive material conferring rubber-like tensile properties to the object. The photoresponsive material used to fabricate the object is comprised of an urethane-acrylate, isobornyl acrylate, dipentaerythritol penta acrylate and bis (2,4,6-trimethylbenzoyl)-phenylphosphineoxide. The rubber-like tensile properties of this photoresponsive material are measured with an extensometer and the results is shown in FIG. 21.

17. Fabrication of Three-Dimensional Objects with Anisotropic Mechanical Properties In an alternate embodiment of this invention, the three-dimensional model of the object to form can be modified so that the resulting three-dimensional object has anisotropic mechanical properties. An example of the modification of three-dimensional model of the object to form is to locally reduce the density of the model.

18. Stationary Build Volume and Stationary Projection Unit

Figure 22:
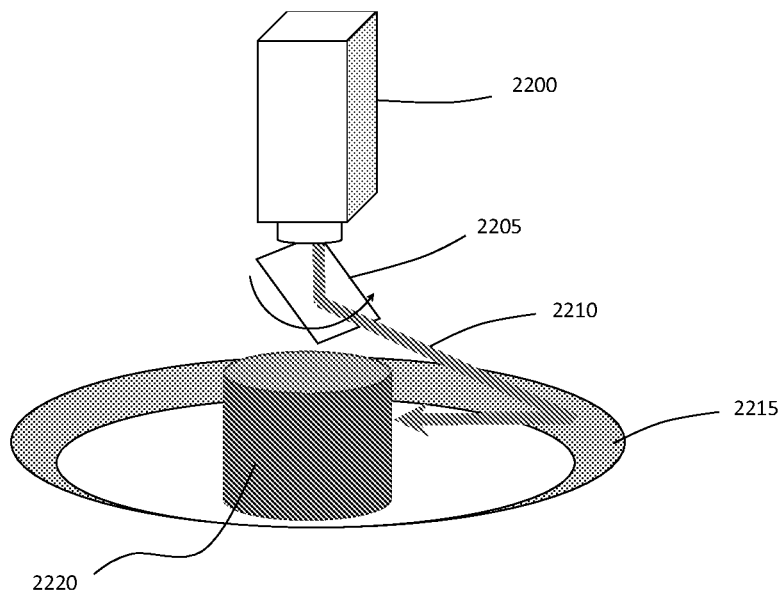
FIG. 22 is a perspective view of an alternate embodiment of an apparatus where the projection unit is fixed and illuminating a system of reflective elements while the build volume remains fixed.

An alternate embodiment of an apparatus of the present invention is shown in FIG. 22 where the projection unit and the vessel containing the responsive medium are fixed. Here, a projection unit 2200 sends a beam of controlled light patterns 2210 onto a first reflective element 2205, which is in turn reflected by a second reflective element 2215 disposed in such a way as to illuminate a vessel 2220 containing a photoresponsive medium. The orientation of the said controlled light pattern 2210 with respect to the vessel 2220 is controlled by rotating the said first reflective element 2205.

The invention claimed is:
1. A method for producing a three-dimensional object comprising:
 a. computing a sequence of back-projections describing the three-dimensional object to be formed from different orientation angles of said object,
 b. defining a sequence of patterns of light using said back-projections, and
 c. irradiating with each of said patterns of light at a respective corresponding orientation angle and, according to the defined sequence, a photoresponsive material that is capable of alteration of its material phase upon irradiation by light, thereby creating a three-dimensional distribution of alterations within the photoresponsive material which physically reproduces said three-dimensional object, thereby creating the three-dimensional object, wherein the alterations of said photoresponsive material are recorded during the irradiation with said patterns of light, and these recordings are used as feedback to correct or adjust subsequent patterns of light in order to produce said three-dimensional object with improved accuracy.

2. The method of claim 1, wherein said photoresponsive material comprises a concentration of a photo-initiator such that at most 90% of an intensity of said patterns of light is absorbed by a largest thickness of a volume of said photoresponsive material through which said patterns of light are propagating.

3. The method of claim 1, with further steps for producing a multi-material three-dimensional object, comprising:
removing uncured parts of said photoresponsive material and immersing said three-dimensional object into another photoresponsive material, and
repeating the steps of calculating, irradiating and removing until said multi-material three-dimensional object is produced.

4. A system for producing a three-dimensional object from a photoresponsive material, the system comprising:
a first projection unit capable of emitting controlled spatial patterns of light;
a means for computing a sequence of back-projections describing the three-dimensional object to be formed from different orientation angles of said object;
and said back-projections being used to define said controlled patterns of light;
a vessel optically transparent to patterns of light, said vessel intended to contain a volume of photoresponsive material, and said vessel and the intended photoresponsive material defining a build volume;
whereby the first projection unit is arranged in the system to irradiate said build volume with said controlled patterns of light; and
a direction varying means operatively associated with said first projection unit, for controllably varying a direction of incidence of said patterns of light relative to said build volume, either by rotating the build volume within a field of illumination of the first projection unit, or by rotating the first projection unit relative to the build volume, or a combination of both of these rotations, and for executing the computed sequence of back-projections by irradiating the photoresponsive material with the controlled patterns of light from directions corresponding to the different orientation angles thereby creating a three-dimensional distribution of alterations of the photoresponsive material, and creating the three-dimensional object, wherein the system is further configured so that the alterations of said photoresponsive material are recorded during the irradiation with said patterns of light and these recordings are used as feedback to correct or adjust subsequent patterns of light in order to produce said three-dimensional object with improved accuracy.

5. The system of claim 4 wherein, additionally to said first projection unit, the system comprises a second projection unit capable of generating patterns of light at a second wavelength of light.

6. The system of claim 5, wherein directions of illumination of the first and the second projection units are parallel to a plane of rotation of the build volume, or the direction of illumination of any one of the first and second projection units is parallel to the plane of rotation of the build volume and the illumination direction of the other projection unit is perpendicular to the plane of rotation of the build volume.

7. The system of claim 5, further configured such that said build volume is illuminated with a first sequence of spatial light patterns at a first wavelength, and concurrently said build volume is illuminated with a second sequence of spatial light patterns at said second wavelength, until the three-dimensional object is formed.

8. The system of claim 5, where said photoresponsive material comprises a photo-inhibitor selected from the list consisting of a photoinitiator that interacts with said second wavelength of light to selectively hinder an ability of the first wavelength of light to alter the phase of said photoresponsive material, and a two-stage photo-initiator such that said photoresponsive material is locally altered upon local simultaneous or successive illumination with said first and second wavelengths of light but not altered if locally illuminated with only one of the wavelengths of light.

9. The system of claim 4 wherein said photoresponsive material is seeded with cells or loaded with solid particles.

10. The system of claim 4 wherein a controller is operatively associated with said build volume for vertically displacing the build volume relative to a field of illumination of the projection unit or projection units.

11. The system of claim 4, wherein the light patterns are corrected for effects selected from the list consisting of a sedimentation of the photoresponsive material, a misalignment of the build volume relative to the direction of incidence of the light patterns, and an absorption of light within said photoresponsive material.

12. The system of claim 4, further configured such that after the formation of the three-dimensional object:
said three-dimensional object is kept into the build volume while a remaining photoresponsive material is removed from the build volume;
a second photoresponsive material, different from the said first photoresponsive material, is filled into the said optically transparent vessel; and
a second three-dimensional object is formed from the second photoresponsive material by the method comprising:
a. computing a sequence of back-projections describing the three-dimensional object to be formed from different orientation angles of said object,
b. defining a sequence of patterns of light using said back-projections, and
c. irradiating with each of said patterns of light at a respective corresponding orientation angle and, according to the defined sequence, a photoresponsive material that is capable of alteration of its material phase upon irradiation by light, thereby creating a three-dimensional distribution of alterations within the photoresponsive material which physically reproduces said three-dimensional object, thereby creating the three-dimensional object, wherein the alterations of said photoresponsive material are recorded during the irradiation with said patterns of light, and these recordings are used as feedback to correct or adjust subsequent patterns of light in order to produce said three-dimensional object with improved accuracy.

13. The system of claim 4, wherein said photoresponsive material is loaded with biological cells before or by injection after forming the three dimensional object around said biological cells.

* * * * *